Nov. 13, 1962 K. W. BINDING 3,063,464
CONTROL VALVE FOR STEAM COOKER
Filed Oct. 14, 1957 3 Sheets-Sheet 1

Inventor
Kenneth W. Binding
by Roberts, Cushman & Grover
Attys

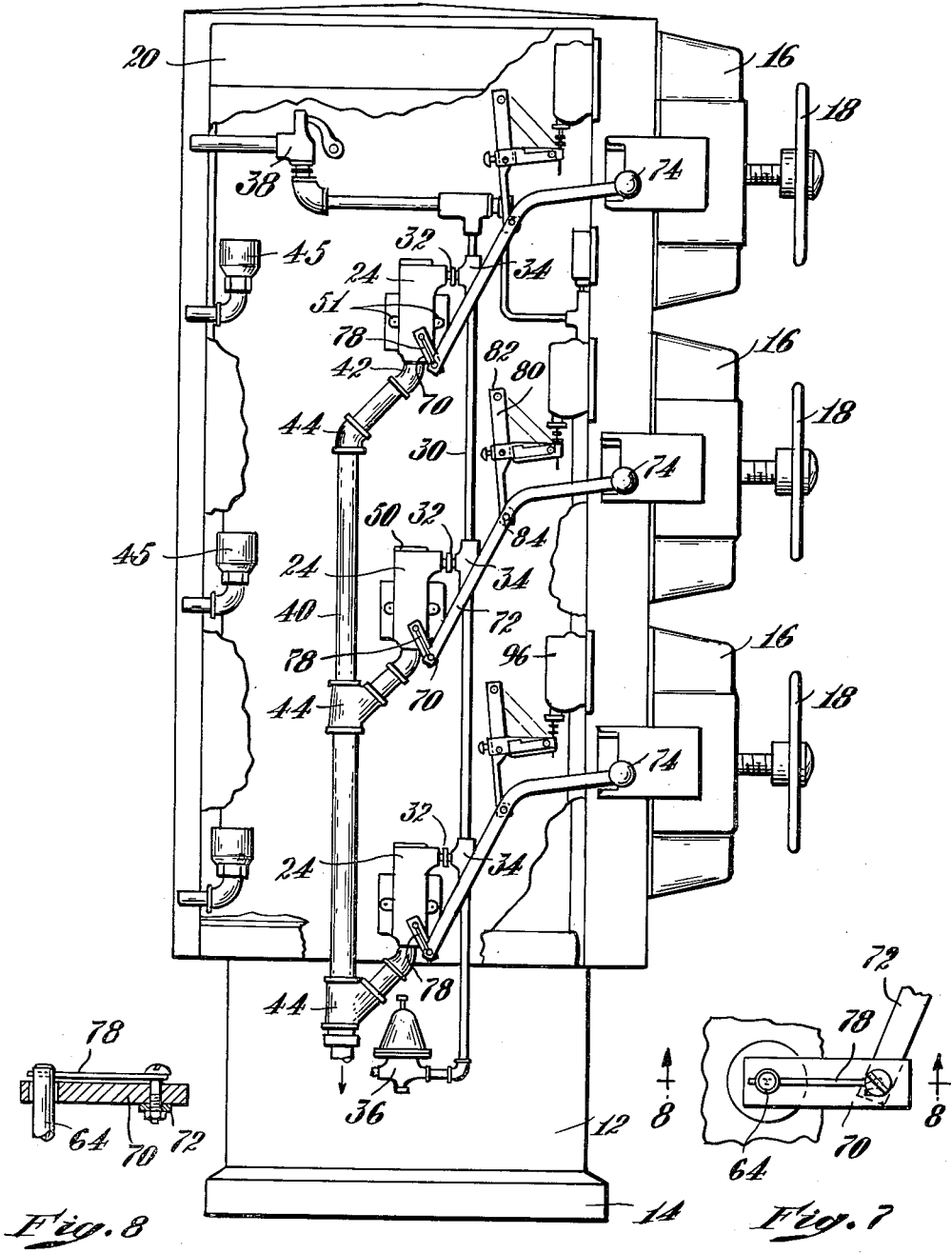

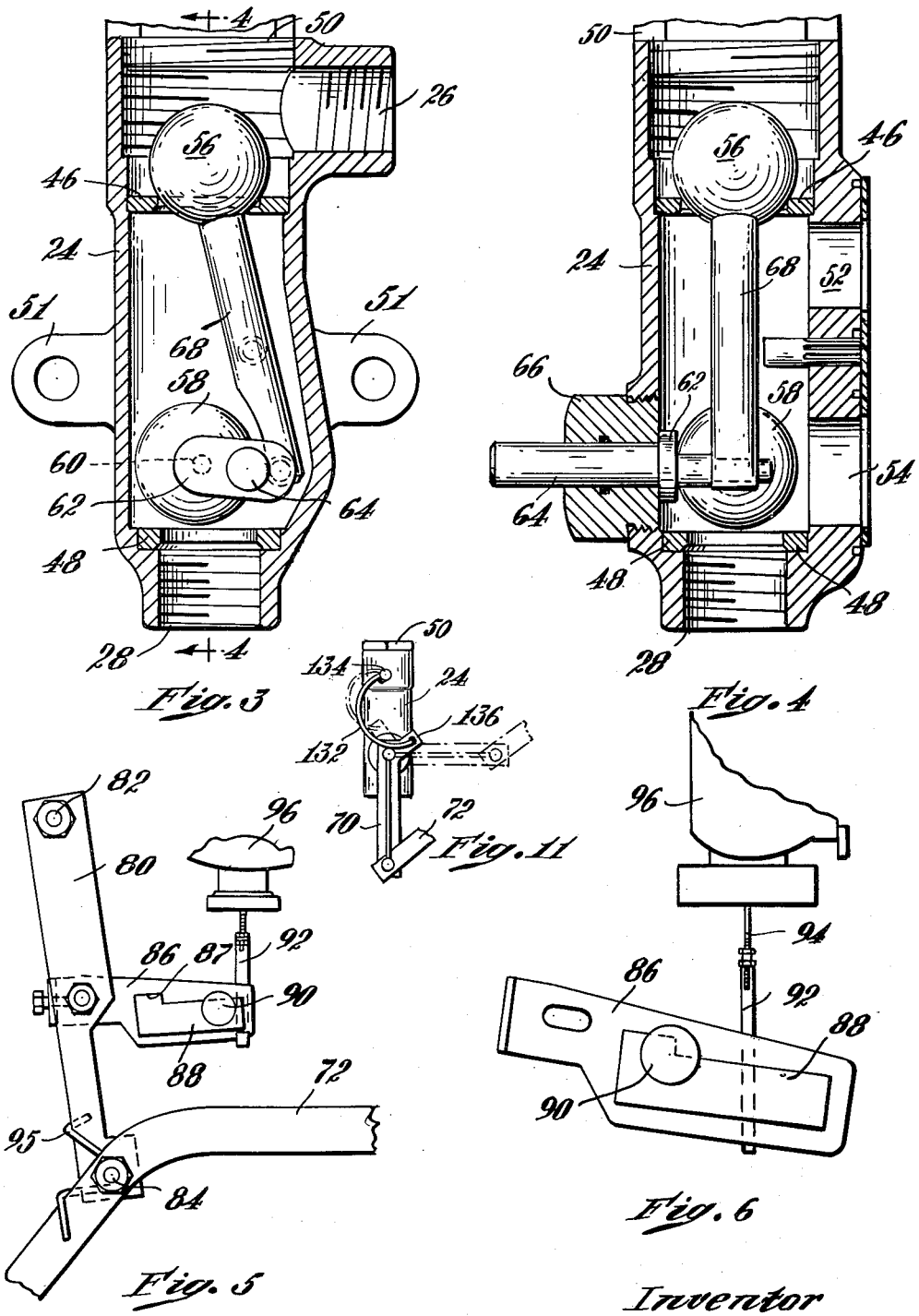

United States Patent Office 3,063,464
Patented Nov. 13, 1962

3,063,464
CONTROL VALVE FOR STEAM COOKER
Kenneth W. Binding, Winchester, Mass., assignor to Market Forge Company, Everett, Mass., a corporation of Massachusetts
Filed Oct. 14, 1957, Ser. No. 689,798
12 Claims. (Cl. 137—241)

This invention relates to steam cookers of the kind in which the cooking period is controlled by a timer so that at the end of a predetermined period valve means is opened thereby to evacuate the cooker, whereupon the cooker is reloaded and a new cooking period is commenced by introducing a new charge of steam to the cooker.

The food to be processed in the cooker is placed therein cold and consequently when the steam is first introduced a considerable amount of it condenses and collects at the bottom of the cooker where it remains throughout the cooking period. Pieces of food which fall from the trays or break away from food resting on the bottom of the cooker fall into the hot water and the admixture constitutes a valuable source of soup or gravy stock which is recovered at the end of each cooking period by drawing it off through the cooker exhaust valve. Such exhaust valves as are currently employed soon become packed with the food particles present in the admixture so that frequent cleaning is necessary, however, in spite of the fact that provision is made for dismantling these valves for cleaning and of the stringent state laws in this respect, due to ineptness and laziness on the part of kitchen help they are seldom more than superficially cleaned with the result that hidden pockets of food accumulate over a period of time which through bacterial action become a decided health menace.

An important object of this invention is to provide novel valve means which is self-scavenging at the end of each cooking period so that any particles of food contained in the condensate are flushed clear through it by the action of the exhausing condensate and steam and so constructed that there are no parts, cracks or crevices into which or behind which particles can become lodged. Another object is to provide valve means which may manually be scavenged if desired during any non-cooking period to further clean and scour the valve with fresh steam so that any grease or the like which may have been left by the used cooking steam can be dissipated.

A frequent complaint of the chief cook is that his assistants do not time the cooking period correctly or forget when the cooking period was started. Accordingly, it is another object of the invention to provide a timed control cooking valve so constructed that the cooking period cannot be started without first setting the timer according to that recommended for the kind of food being processed. Another object is to provide a timing mechanism which will function decisively at the end of a cooking period to open the exhaust valve and not prematurely thereto, as for example by jarring of the apparatus. Still another object is to provide means for terminating the cooking period at will, if desired, independently of the time setting.

Other objects are to provide a valve which is long wearing and self-seating and to provide a valve actuating means for effecting seating of the valves without damaging the valves or their seats. Still another object is to provide an assembly including the steam header and exhaust manifold which may be installed as a unit and removed as a unit in the event that the valve or its connection becomes obstructed or defective.

In accordance with the foregoing each chamber of the cooker is provided with a single valve for both supplying steam to the chamber and exhausing steam and condensate therefrom, the valve having a hollow body with charging and exhaust ports in direct communication with each other, valve elements arranged to engage the seats seats adjacent the charging and exhaust ports and laterally disposed inlet and outlet ports in communication with the cooking chamber. There is means arranged to move the valve elements simultaneously to open one and close the other in such fashion that for a short interval both are opn so that during a part of the discharge of steam and condensate from the cooker chamber there is a flow of steam directly through the valve body which scavenges the interor of the valve body and the valve elements at the end of each cooking period. The means for moving the valve elements is also designed to move them through different distances with respect to their seats and at different rates so that, while the valve elements move simultaneously and both are open at the same time for an interval, the exhaust port area uncovered by the exhaust valve during a given period is larger than the charging port area with the result that the spent steam and condensate exhaust at a much faster rate than live steam is permitted to enter.

The means interconnecting the valves for effecting the foregoing comprises a rocker mounted within the valve body to which the valve elements are connected at different distances from its axis of rotation for movement simultaneously in one direction to seat one valve and unseat the other and in the opposite direction to seat the other valve and open the one valve. The valve elements are in the form of balls and their seats are annular and have sharp edges. The rocker is mounted on a spindle and the ball valve arranged to cover the discharge port is loosely secured to the rocker so as to be rotatable with respect to its seat. A portion of the spindle extends exteriorly from the valve body and there is a manually operable linkage connected to the spindle for turning the spindle and hence the rocker to close the exhaust valve and open the charging valve thereby to commence a cooking period. The connection between the linkage and the spindle is afforded by a resilient member so that the valve elements cannot be forced against their seats hard enough to cause damage thereto. A latch is associated with the manually operable means which is engaged when the charging valve is open to hold the valve open until the timer returns to its zero setting, whereupon means connected to the timer releases the latch so that the charging valve is closed and the exhast valve is opened. The timer may however be manually returned to its zero position before the period has expired, whereupon the latch will be released. At the zero setting of the timer the latch release means connected thereto occupies a position which prevents the latch from being engaged to hold the valve open, so that until the timer is set for a definite period the cooker cannot be operated without manually holding the operating lever throughout the entire cooking period. Since it is possible to open the valve independently of the timer the valve may be opened between cooking periods to admit steam to the valve body for scavenging.

The valve body, the steam header and the exhaust manifold are constructed as a unit assembly which may be installed by bolting to the wall of the cooker and which is easily removable in the event of obstruction or defect for replacement by a new assembly.

The invention will now be described in greater detail with reference to the accompanying drawings wherein:

FIG. 2 is a side elevation showing three valves, one for each cooker, together with control mechanism for each;

FIG. 3 is a diametrical section through one of the valves in a plane parallel to the side of the cooker;

FIG. 4 is a diametrical section through the valve taken in a plane perpendicular of the side of the cooker;

FIG. 5 is an enlarged fragmentary section of a part of the linkage for opening and closing the valve, shown in the position which it would have when the valve is closed;

FIG. 6 is a fragmentary elevation to still larger scale of the trigger for the linkage shown in the position it would have when the valve is open;

FIG. 7 is a plan view of the yieldable connecting means between the linkage and the valve spindle;

FIG. 8 is a section taken on the line 8—8 of FIG. 7;

FIG. 11 is an elevation of toggle mechanism for mechanically holding the valve in its open or closed position.

Figures 1, 9, 10:
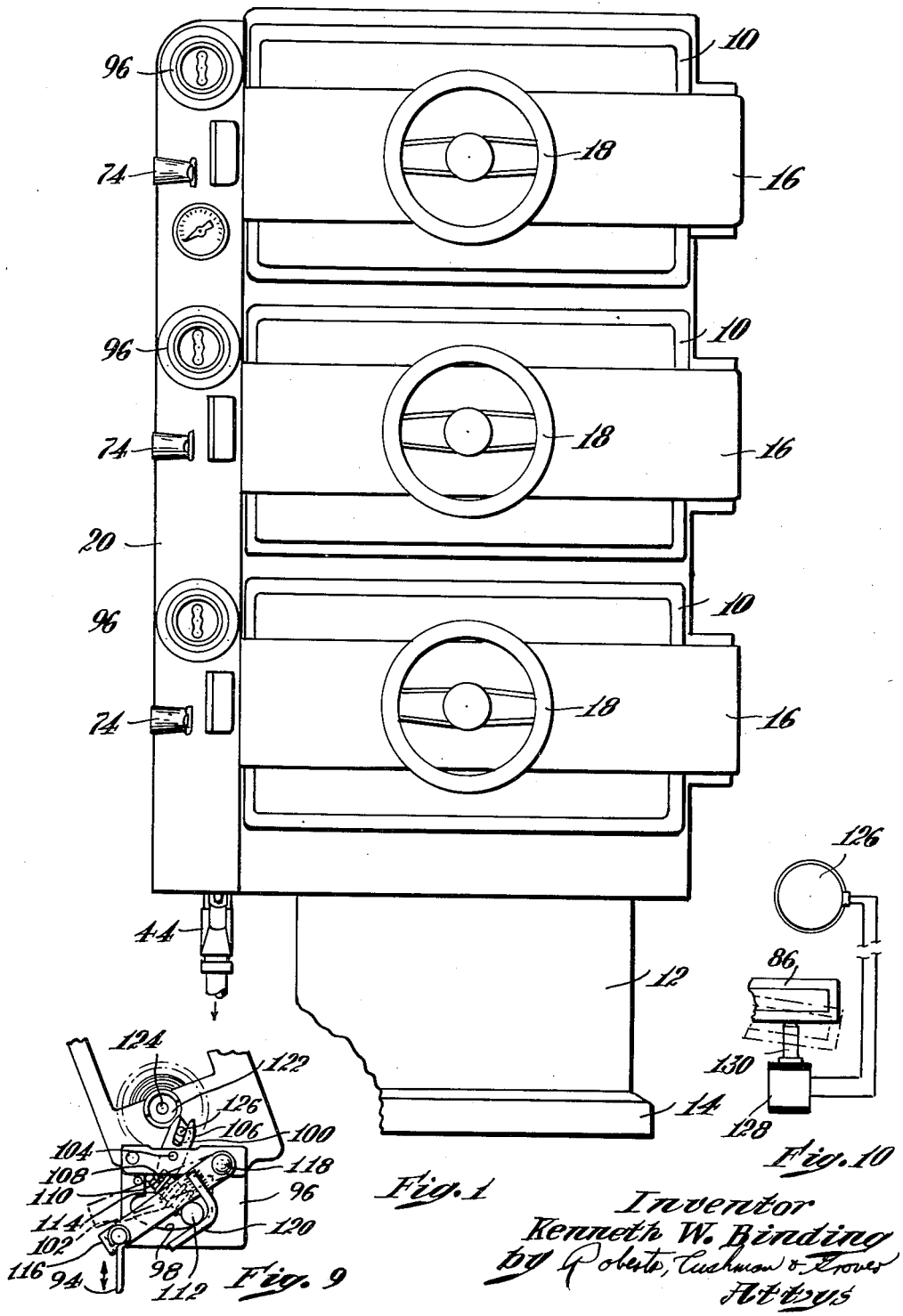
FIG. 1 is a front elevation of a steam cooker in which there are three cooking units vertically superposed, each unit being of identical construction.
FIG. 9 is an elevation of a clock mechanism and toggle switch.
FIG. 10 is an elevation of a modified electric clock mechanism.

Referring to the drawings, FIGS. 1 and 2, there is shown a steam cooker having three steam chambers 10, one above the other, the lowermost one being supported by a base 12 provided with a foot 14. Each chamber is of identical construction and is constituted by a suitably insulated double wall box of rectangular cross-section having an open side over which may be clamped a door 16. The door may be supported at one side, for example by hinges and have at its other side a latch for holding it closed. A screw is mounted on the door with one end extending inwardly and the other end extending outwardly and on the inner end of the screw there is mounted a second door which covers the opening and has on it a gasket. A hand wheel at the outer end of the screw provides means for turning the screw and forcing the inner door against the opening in opposition to the outer door which is held at its ends respectively, by the hinges and the latch, thereby to set the inner door steam tight. The hand wheel also affords convenient means for swinging the door open and closed when the latch is released.

At the left-hand side of the apparatus there is fastened a housing 20 for containing and concealing the control mechanism for charging steam to the several cooking chambers and exhausting it therefrom, as will appear hereinafter.

Within the housing 20 there is fastened to the wall of each chamber a valve housing 24 (FIGS. 2, 3 and 4), each of which has an inlet or charging port 26 and an outlet or exhaust port 28. The several charging ports 26 are connected to a common steam header 30 (FIG. 2) by appropriate nipples and T's 32 and 34. The lower end of the steam header 30 is provided with a pressure regulator 36 so that the steam supplied to the cooker may be controlled and varied as desired. At the upper end of the steaem pipe 30 there is a safety valve 38. Steam and condensate are discharged from the several valves through a common manifold pipe 40 to which the exhaust ports are connected by nipples 42 and junctions 44. A thermostatically controlled steam trap valve 45 is provided for each chamber so that when the cooker is initially closed and steam commences to enter, the ambient air within the cooker may be exhausted rapidly until the cooker is filled with steam, whereupon it will close the valve.

Since each valve 24 is identical in construction and operation the following description will be confined to a single valve and its associated mechanism.

Referring to FIGS. 3 and 4, each valve body 24 is hollow, being substantially circular in cross-section and contains inwardly of its charging and exhaust ports annular valve seats 46 and 48. Preferably these seats are removable and are made of stainless steel so as to insure sanitary conditions. The charging port enters the side of the valve housing and the exhaust port enters the lower end of the valve housing. The upper end of the valve housing has an opening into which is threaded a cap 50 which may be removed for the purpose of cleaning the valve or replacing the valve components within it if necessary. In the wall of the valve body between the seats (FIG. 4) there are two ports 52 and 54 adapted to register with a pair of correspondingly spaced ports in the wall of the cooker chamber. The ports 52 and 54 permit steam which passes through the valve seat 46 to enter the cooker chamber until the condensate rises above the port 54, whereupon it continues to enter the cooking chamber but only through the port 52. During discharge, the steam and condensate escape respectively through the ports 52 and 54 and the valve seat 48 through the discharge manifold 40 which in turn discharges the mixture of steam and condensate into a tank or tray for recovery of the admixture of condensate and food particles.

The valve means for controlling the flow of steam through the valve body and hence into and out of the cooker is comprised of two balls 56 and 58, arranged adjacent the seats 46 and 48, the ball 56 being located between the charging port 26 and the seat 46 and the ball 58 being located between the two seats 46 and 48 adjacent the seat 48. The ball 58 is loosely retained on a pin 60 so that it may turn freely about the axis of the pin and the latter is fastened to one end of a rocker 62. The rocker 62 is fixed on the inner end of a spindle 64 which is journaled in the wall of the valve housing for movement about its longitudinal axis, the outwardly projecting portion of the spindle being packed and held in place by a suitable bearing nut 66. The ball valve 56 is fixed to the upper end of a link 68, the lower end of which is pivotally fastened to the opposite end of the rocker at the opposite side of the axis of the spindle 64 and at a different distance from this axis, to wit, a lesser distance than the distance of the ball 58 from the axis of the spindle. As thus constructed, rotation of the spindle 64 in one direction will simultaneously raise the ball 56 from its seat and lower the ball 58 into engagement with its seat and in the opposite direction will lower the ball 56 into engagement with its seat and raise the ball 58 from its seat, thus both valves are opened at the same time, providing a clear passage through the valve body so that live steam entering the valve not only enters the cooking chamber but also passes directly through the interior of the valve body and scavenges the interior and the valve elements. The linkage is so proportioned that the ball 58 is moved farther off its seat than the ball 56 and at a much faster rate so that at any given period the area of the exhaust port is greater than the area of the charging port. Thus the spent steam and condensate will exhaust rapidly enough so that there is still sufficient live steam entering at the end of exhaustion to scavenge the last of any particles of food contained in the exhausting condensate from the valve body.

By loosely securing the ball 58 at the end of the rocker 62, seating of the ball is insured since it will adjust itself to its seat even though there may be slight irregularities or worn spots, and moreover since it is free to turn, different parts of the ball will engage the seat so that there is no repeated contact of the same part of the ball with the seat time after time. To still further implement steam tight seating the valve seats are constructed with sharp edges so that when any foreign matter is caught between the ball and the seat, the ball will be more likely to cut through the impedimenta and thus seat itself than to be held away from the seat.

As herein illustrated, the valve is manually opened, that is, the ball 56 is raised from its seat and the ball 58 is lowered into engagement with its seat to permit the cooker to be filled with steam. To this end one end of an arm 70 (FIGS. 7 and 8), is pivotally connected to the projecting portion of the spindle 64. A lever 72 is pivotally connected at its lower end to the arm 70 and extends upwardly and outwardly of the housing at its front side and has on its outwardly projecting portion a knob 74 by which it may be grasped. A resilient wire 78 (FIG. 7) is fastened at one end to the arm 70, for example beneath the head of the pivot bolt, by means of which the lever 72 is connected to the arm 70, and at its other end to the spindle 64 so that force applied to the arm 70 by pulling or pushing on the rod 72 is transmitted to the spindle 64 through the resilient wire 78 which cushions the action and hence prevents injury to the valve or its seat when it is swung open or closed.

When the rod 72 is pulled forwardly to open the valve it is latched in this position and held there until the end of a predetermined time cycle. In FIGS. 2 and 5, there is shown a link 80 supported by the pivot pin 82 attached to the wall of the steam chamber 10. The lower end of the link is pivotally connected at 84 to the rod 72. A latch 86 is pivotally connected at one end to the link 80 and has an L-shaped slot 88 through it, through which projcts a latch bolt 90. In FIG. 5, the latch is shown in its disengaged position. When the rod is pulled forwardly to open the valve the latch is simultaneously drawn forward so as to engage the bolt behind a notch 87 in the slot 88, as shown in FIG. 6. A stirrup 92 is engaged with the distal end of the latch and is connected by a suitable cable 94 to a timer 96. Normally the stirrup 92 occupies the position shown in FIG. 5, that is, when the timer is at a zero position and if the rod 72 is pulled forward the latch rides along the stirrup and is held up so that the notch 87 will not drop down over the latch bolt and hence if the rod 72 is released the valve merely recloses. It is to be observed that by manual manipulation of the rod 72 the valve may be held as long as the rod is held to permit steam to pass through the valve and hence provides means for scavenging the valve at will. When the timer is set to a given period the setting of the timer lowers the stirrup which permits the notch 87 to engage the latching bolt and thus hold the valve open until the end of the period, whereupon the latch is raised to disengage the notch from the latch bolt and hence permit the valve to close. Closing movement is effected by a spring 95 having ends bearing respectively on the rod 72 and the arm 80.

Conventional timing mechanism is employed supplemented by a toggle switch mechanism to insure snap action of the latch and to eliminate premature operation caused by vibration or jarring of the cooker. The toggle switch (FIG. 9) comprises a rigid frame 96 having a fixed arcuate track 98 and a pair of toggle elements 100 and 102. The toggle element 100 is pivoted to the frame at 104 and has a bifurcated end 106 for connection to the clock mechanism, as will be described hereinafter. The opposite end of the element 100 has fixed to it a pin 108 which occupies a slot 110 in the adjacent end of the link 102. The opposite end of the link 102 has a rocker 112 which rides on the track 98. A stiff coiled spring 114 is interposed between the pin 108 and the rocker 112 and biases the toggle links in one direction or the other. By tipping the toggle link 100 in a clockwise direction the toggle link 102 may be caused to snap to the left in a counterclockwise position, in which position the rocker 112 will become lodged in the right-hand end of the track. By tipping the lever 100 in the opposite direction the toggle 102 will be shifted to the opposite end of the track. An arm 116 is pivoted on the frame at 118 and has fixed to it a hook 120, a portion of which underlies the rocker 112. The underside of the arm 116 rests on the rocker 112 and is held loosely against it by the hook. When the rocker 112 is at the left-hand end of the track the arm 116 is held at a higher elevation than it is when it is at the right-hand end of the track. The cable 94 which carries the stirrup 92 is connected to the distal end of the link 116. The bifurcated end 106 of the toggle link 100 is connected to the clock mechanism in such fashion that when the clock is set to a predetermined time the toggle link 102 is shifted to bring the rocker 112 to the left-hand position and thereby to raise the arm 116 and hence the stirrup so that when the rod 72 is brought forward the notch 87 will drop down over the latch bolt and retain it in position. The connection between the toggle link 100 and the clock mechanism is afforded by means of a lever 122 which is fastened directly to the main spring operated spindle 124 of the clock mechanism. The lever 122 has a pin 126 fixed to it which engages the bifurcated end of the toggle lever 106 so that when the clock is set the lever 106 will be swung in one direction and when the timer runs down it will be swung in the opposite direction. As thus constructed it is apparent that a positive snap action is provided which will not be influenced by stray vibrations so as to terminate the cooking period prematurely and that means is provided for positive preventing commencement of the cooking period without setting the clock for a given time. The clock mechanism itself may be turned back, that is, the main shaft 124 may be turned back without effecting the running of the clock mechanism until the end of the period is terminated to shift the toggle to its off position and hence to open the valve in the event that it is desirable to open the cooker before the set period is expired. This however will not shorten the time period as the clock mechanism will continue to operate until the time is expired and thus the supervisor can tell by the fact that this clock mechanism continues to click that the cooker has been opened prematurely for some reason or another.

Alternatively, an electric clock 126 (FIG. 10) may be employed. Setting of the clock closes a pair of contacts so as to energize a spring biased solenoid 128 to retract its plunger 130. Retraction of the plunger 130 allows the latch 86 to drop down to the position shown in dot dash lines for engagement with the bolt 90, when the lever 72 is pulled forward. Until the clock is set the plunger 130 holds the latch up so that it cannot be engaged with the bolt. When the time runs out the solenoid is disengaged by separation of the contacts whereupon the plunger under the force of the spring lifts the latch out of engagement with the bolt.

It may be desirable under some circumstances to dispense with the clock control or to disconnect it and manually operate the valve. Accordingly, there is shown in FIG. 11 a toggle for holding the valve in either its closed or open position. As there shown the toggle comprises an elastic C-shaped spring 132 pivotally connected at its ends respectively, to the valve housing at 134 and to a lug 136 on the arm 70.

To facilitate cleaning and repair the several valves 24, header 30 and manifold 40, together with the connections are made up as a unit assembly and the unit is fastened to the side of the cooker by means of bolts which extend through ears 51—51 integral with the valve body. When it is desirable to remove the assembly as a whole all that is required is that the resilient members 78 be withdrawn from the spindles 64 so as to permit the arms 70 to be disengaged from the spindles. By removing the screw bolts the assembly may then be taken off and returned to the manufacturer for replacement. If only a minor repair is required the cap 50 may be unscrewed which will give access to the interior of the valve body.

It should be understood that the present disclosure is for the purpose of illustration only and that this invention includes all modifications and equivalents which fall within the scope of the appended claims.

I claim:

1. For use with a pressure cooker containing an opening through a wall through which steam may enter and leave, a valve adapted to be attached to the wall of the cooker over the opening to supply steam to the cooker and exhaust it therefrom, said valve comprising a valve body having charging and discharging ports in direct communication with each other, through the interior of the valve body, and a pair of intermediate, laterally disposed inlet and outlet ports adapted for registration with the opening in the wall of the cooker chamber, valve seats adjacent the charging and discharging ports, said valve seats containing orifices and said orifices corresponding in size to each other and being arranged in axial alignment, valve elements to engage the seats, and means for effecting movement of the valve elements simultaneously to close one and open the other, but at different rates, such that the discharge valve is fully opened before the charging valve is fully closed.

2. A valve for a steam pressure cooker comprising a valve body having charging and exhaust ports in direct communication with each other, through the interior of the valve body, valve seats adjacent said ports, said valve seats containing orifices and said orifices corresponding in size to each other and being arranged in axial alignment, valve elements arranged to be engaged with said seats, and means interconnecting the valve elements for movement in unison to lift the exhaust valve from its seat at a faster rate than the charging valve is moved toward its seat.

3. A valve according to claim 2, comprising a valve body having a clean-out opening in axial alignment with the valve seats, of larger diameter, than the seats through which they may be removed for cleaning of the valve body, and a threaded plug normally screwed into said clean-out opening.

4. A valve according to claim 2, comprising a spindle for effecting operation of said interconnecting means, said spindle having a part projecting exteriorly of the valve body, an arm pivotally mounted on the exteriorly projecting portion of the spindle, a manually operable lever pivotally connected to the arm and operable to swing the arm about the axis of the spindle, and a yieldable element fixed at one end to the arm and at its other end to the spindle.

5. A valve for a steam pressure cooker comprising a valve body having charging and discharging ports in direct communication with each other, through the interior of the valve body, valve seats adjacent said ports, said valve seats containing orifices and said orifices corresponding in size to each other and being arranged in axial alignment, valve elements arranged to be engaged with said seats, said valves in their open positions being at different distances from their seats, the discharge valve being at a greater distance, and linkage interconnecting the valve elements so that the discharge valve is moved to and from its seat at a faster rate than the charging valve from and to its seat.

6. A valve for a steam pressure cooker comprising a valve body having charging and discharging ports in direct communication with each other, through the interior of the valve body, valve seats adjacent the ports, said valve seats containing orifices and said orifices corresponding in size to each other and being arranged in axial alignment, valve elements arranged to be engaged with the seats, a rocker mounted in the valve body for rocking movement about a given axis, means operable from externally of the valve body to rock said rocker and means connecting the valve elements to the rocker at different distances from its axis, said distances being so proportioned that for a given time the discharge valve travels through a greater distance from its seat to its open position then the charging valve travels from its open position to its seat.

7. A valve comprising a valve body having charging and exhaust ports, valve seats adjacent said ports, said valve seats containing inlet and outlet orifices corresponding in size to each other and being arranged in axial alignment, a spindle journaled in the valve body for rotation about a given axis, a rocker fast to the spindle for rotation therewith for rocking movement of the rocker, an exhaust valve element mounted on the rocker at a given distance from the axis of the spindle adjacent the outlet orifice, a charging valve element mounted on the rocker at a different distance from the axis of the spindle adjacent the inlet orifice, said charging and exhaust valve elements closing and opening simultaneously but at different rates which are proportional to their distances from the axis of the spindle, said exhaust valve element, when at its wide open position, providing a larger opening than the opening which is provided when the charging valve element is wide open.

8. A valve comprising a valve body having charging and exhaust ports, valve seats adjacent the ports, said valve seats containing orifices and said orifices corresponding in size to each other and being arranged in axial alignment, valve elements arranged to be engaged with the seats to control flow through said orifices, and means supporting the valve elements comprising a spindle journaled in the body for rocking movement about a given axis, a rocker fast to the spindle for rotation therewith about the axis of the spindle, to which one of the valve elements is connected at a given distance from the axis of the spindle, and a link connecting the other valve element to the rocker at a different distance from the axis of the spindle.

9. A valve comprising a valve body having charging and exhaust ports, valve seats adjacent the ports, said valve seats containing orifices and said orifices corresponding in size to each other and being arranged in axial alignment, valve elements arranged to be engaged with said seats to control flow through said orifices, and means supporting the valve elements comprising a spindle journaled in the valve body for rocking movement about a given axis, a rocker fast to the spindle for rotation therewith about the axis of the spindle to which the exhaust valve element is loosely secured at a given distance from the axis of the spindle, and a link pivotally connecting the other valve element to the rocker at a different distance from the axis of the spindle and at the opposite side of said axis from the one valve element.

10. A valve for use with a steam pressure cooker having an opening in its wall through which steam may enter and leave, said valve being adapted to be fastened to the wall of the cooker over the opening and having charging and exhaust ports in communication with each other and adapted for communication with the interior of the cooker through said opening, valve seats adjacent the ports, said valve seats containing orifices and said orifices corresponding in size to each other and being arranged in axial alignment, valve elements arranged to engage the seats and mechanism interconnecting the valve elements so that when one is seated the other is opened and during the period of transition from one position to the other, the exhaust valve moves away from its seat at a faster rate than the charging valve moves toward its seat.

11. A valve for use with a steam pressure cooker having an opening in its wall through which steam may enter and leave, said valve being adapted to be fastened to the wall of the cooker over the opening and having charging and exhaust ports adapted for communication with the interior of the cooker through said opening, valve seats adjacent the ports, said valve seats containing orifices and said orifices corresponding in size to each other and being arranged in axial alignment, valve elements arranged to engage the seats and means interconnecting the valve elements comprising a rocker mounted in the body of the valve for rocking movement about a given axis, means loosely mounting one valve element on the rocker at a given distance from its axis for movement in an arc about said axis into and out of contact with the seat, a link connected at one end to the other valve element and means pivotally connecting the opposite end of the link to the rocker at a different distance from its axis for linear movement into and out of engagement with its seat.

12. A valve comprising a valve body having charging and exhaust ports, annular valve seats adjacent the ports, said seats being located inwardly of the ports in substantially axial alignment, a ball valve associated with each seat, one between its seat and the associated port, and the other between the two seats, a spindle journaled in the wall of the body adjacent said other valve on an axis parallel to the planes of the valve seats, and spaced from the axis of the centers of said valve seats with an end projecting externally of the body, a rocker mounted on the spindle for movement about the axis of the spindle, said other ball valve being loosely connected to the rocker for movement in an arc about the axis of the spindle to and from its seat, and a link pivotally connected at one end to the rocker at the opposite side of the axis of the spindle and at a different distance therefrom, said one valve being connected to the other end of the link for linear movement to and from its seat.

References Cited in the file of this patent

UNITED STATES PATENTS

| | | |
|---|---|---|
| 314,708 | Page | Mar. 31, 1885 |
| 384,833 | Faulkner | June 19, 1888 |
| 623,331 | McOsker et al. | Apr. 18, 1899 |
| 739,684 | Kehr | Sept. 22, 1903 |
| 935,719 | Wolf | Oct. 5, 1909 |
| 1,172,975 | Frazer | Feb. 22, 1916 |
| 1,249,293 | Norwood | Dec. 4, 1917 |
| 1,286,971 | Farr | Dec. 10, 1918 |
| 1,628,895 | McKenna | May 17, 1927 |
| 1,865,973 | Shields | July 5, 1932 |
| 2,063,809 | Isaacs | Dec. 8, 1936 |
| 2,148,703 | Martin | Feb. 28, 1939 |
| 2,257,435 | Thumin | Sept. 30, 1941 |
| 2,396,809 | Addison | Mar. 19, 1946 |
| 2,452,790 | Pledger | Nov. 2, 1948 |
| 2,530,599 | Conradson | Nov. 21, 1950 |
| 2,592,705 | Jewel et al. | Apr. 15, 1952 |
| 2,618,219 | Hummel | Nov. 18, 1952 |
| 2,743,738 | Johnson | May 1, 1956 |
| 2,773,548 | Thompson et al. | Dec. 11, 1956 |
| 2,778,375 | Pape et al. | Jan. 22, 1957 |

FOREIGN PATENTS

| | | |
|---|---|---|
| 5,106 | Great Britain | 1892 |
| 661,173 | Great Britain | of 1951 |
| 902,901 | Germany | of 1954 |
| 9,806 | Great Britain | 1906 |